United States Patent
Wang et al.

(10) Patent No.: US 11,260,290 B2
(45) Date of Patent: Mar. 1, 2022

(54) JOYSTICK MODULE

(71) Applicant: Primax Electronics Ltd., Taipei (TW)

(72) Inventors: You-Ping Wang, Taipei (TW); Jun-Hui Ma, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 180 days.

(21) Appl. No.: 16/862,774

(22) Filed: Apr. 30, 2020

(65) Prior Publication Data

US 2021/0283495 A1   Sep. 16, 2021

(30) Foreign Application Priority Data

Mar. 13, 2020   (CN) .......................... 202010173998.0

(51) Int. Cl.
*A63F 13/24* (2014.01)
*G06F 3/0338* (2013.01)
*F21V 8/00* (2006.01)

(52) U.S. Cl.
CPC ............ *A63F 13/24* (2014.09); *G02B 6/0001* (2013.01); *G06F 3/0338* (2013.01); *A63F 2300/1043* (2013.01)

(58) Field of Classification Search
CPC ...... G06F 3/0202; G06F 3/0205; G06F 3/033; G06F 3/0338; G06F 3/0354; G06F 3/03541; G06F 3/03543; G06F 3/038
See application file for complete search history.

(56) References Cited

U.S. PATENT DOCUMENTS 10,599,012 B2 * 3/2020 Song ...................... H01H 9/161
11,112,932 B2 * 9/2021 Powderly ............ G06F 3/04883
2005/0077155 A1 * 4/2005 Wang ...................... A63F 13/24
                                                                200/6 A
2006/0079328 A1 * 4/2006 Wang ...................... A63F 13/06
                                                                463/37
2009/0084214 A1 * 4/2009 Sakai ..................... A43B 21/42
                                                                74/471 XY
2009/0184852 A1 * 7/2009 Ahn ....................... G06F 1/1626
                                                                341/31
2011/0168874 A1 * 7/2011 Phan Le ............... G01S 7/4813
                                                                250/208.6
2012/0274563 A1 * 11/2012 Olsson .................. G05G 9/047
                                                                345/161
2013/0265233 A1 * 10/2013 Obermeyer ............ G01D 5/285
                                                                345/161
2021/0197075 A1 * 7/2021 Seibert .................. A63F 13/235

* cited by examiner

*Primary Examiner* — David L Lewis
*Assistant Examiner* — Shauna-Kay Hall
(74) *Attorney, Agent, or Firm* — Kirton McConkie; Evan R. Witt

(57) ABSTRACT

A joystick module includes a main body, a light guide structure and a light source. The main body includes at least one hollow region. The light guide structure is disposed within the main body. The light guide structure includes a first light guide part and a second light guide part with different transmittances. The first light guide part has a light output surface exposed outside the hollow region. The second light guide part has a light input surface. The light source is disposed within the main body and located beside the light input surface of the second light guide part. After the light source emits a light beam, the light beam is introduced into the light guide structure through the light input surface of the second light guide part and exited from the at least one light output surface of the first light guide part.

10 Claims, 3 Drawing Sheets

JOYSTICK MODULE

FIELD OF THE INVENTION

The present invention relates to a joystick module, and more particularly to a luminous joystick module.

BACKGROUND OF THE INVENTION

A video game console or an electronic game console is an electronic entertainment device that is familiar to people. In views of the current market consumption trends and the electronic game development, many electronic games possess creative benefits and provide sensory experiences in various operations, and even provide simulation training functions for related technologies. Consequently, such devices are suitable for the users of all ages and become indispensable electronic products for modern people.

Generally, this electronic entertainment device is operated through a handlebar device. The handlebar device is in communication with a host in a wired connection manner or a wireless connection manner. The handlebar device is a man-machine interface that can provide ergonomic grip (such as a single-handed grip or a double-handed grip) and can control the executed game or application function. The direction control function is an important function of this handlebar device. In addition to the cross key, the four-direction key (i.e., the up/down/left/right arrow key) and the trackball, a joystick is a usual design.

A joystick is a directional stick. According to the available operating axis, the joysticks can be classified into single-axis joysticks, two-axis joysticks and three-axis joysticks. The single-axis joystick allows movement in two directions. The two-axis joystick allows movement in four directions. The three-axis joystick allows movement in all directions (i.e., 360 degrees). Moreover, according to the appearance and structure, the joysticks can be operated with a single-finger (e.g., the thumb) or through a palm-holding action. Consequently, the joysticks can be used to perform the direction control operation in in various games or application functions.

Nowadays, the joysticks on the handlebar devices are researched and developed by the research and development engineers in views of the user comfort and the use life increase. However, the research and development engineers do not pay much attention to the design of the joystick appearance. Since the appearance is monotonous, the fashion sense of the product is largely reduced.

Therefore, it is important to provide an improve joystick module to overcome the drawbacks of the conventional technologies.

SUMMARY OF THE INVENTION

The present invention provides a joystick module. The joystick module includes a light source and a light guide structure. The light source emits a light beam. The light beam is guided by the light guide structure. Consequently, the light beam is outputted from a specified site of the joystick module.

The other objects and advantages of the present invention will be understood from the disclosed technical features.

In accordance with an aspect of the present invention, a joystick module is provided. The joystick module includes a main body, a light guide structure and a light source. The main body includes at least one hollow region. The light guide structure is disposed within the main body. The light guide structure includes a first light guide part and a second light guide part with different transmittances. The first light guide part has at least one light output surface exposed outside the hollow region. The second light guide part has a light input surface. The light source is disposed within the main body and located beside the light input surface of the second light guide part. After the light source emits a light beam, the light beam is introduced into the light guide structure through the light input surface of the second light guide part and exited from the at least one light output surface of the first light guide part.

In an embodiment, the main body includes a first joystick part and a second joystick part, and the first joystick part and the second joystick part are connected with each other. The first light guide part is disposed within the first joystick part. The second light guide part is disposed within the second joystick part. The at least one hollow region is formed in the first joystick part.

In an embodiment, the first joystick part includes a cap structure and a first magnetic element. The at least one hollow region is formed in the cap structure. The first magnetic element includes a supporting portion and an extension portion. A first end of the supporting portion supports the cap structure. The extension portion is connected with a second end of the supporting portion and extended toward the second joystick part. The extension portion is disposed within the second joystick part. The second joystick part includes a casing, a support element and a second magnetic element. The support element and the second magnetic element are disposed within the casing. A first end of the support element supports the first magnetic element. The second magnetic element is fixed on a second end of the support element. The extension portion of the first magnetic element is enclosed by the second magnetic element.

In an embodiment, the first joystick part is detachably connected with the second joystick part. When the first joystick part and the second joystick part are connected with each other, a magnetic force is generated between the first magnetic element of the first joystick part first joystick part and the second magnetic element of the second joystick part, so that the first joystick part and the second joystick part are fixed on each other.

In an embodiment, the first light guide part is disposed within the cap structure, the supporting portion of the first magnetic element is enclosed by the first light guide part, and the at least one light output surface of the first light guide part is exposed outside the at least one hollow region of the cap structure. The second light guide part is disposed within the casing. The support element and the second magnetic element are enclosed by the second light guide part. The second magnetic element is arranged between the support element and the light input surface of the second light guide part.

In an embodiment, the at least one hollow region includes plural hollow regions including a first hollow region and a second hollow region, and the at least one light output surface of the first light guide part includes a first light output surface and a second light output surface. The first hollow region is formed in a first side of the cap structure away from the second joystick part. The second hollow region is formed in a second side of the cap structure close to the second joystick part. The first light output surface is exposed outside the first hollow region. The second light output surface is exposed outside the second hollow region.

In an embodiment, the first light guide part and the second light guide part of the light guide structure are in direct contact with each other, so that a continuous light guiding path is defined by the first light guide part and the second light guide part collaboratively.

In an embodiment, the light source includes a circuit board, plural light-emitting elements and plural electric connection elements. The circuit board is arranged between the plural light-emitting elements and the plural electric connection elements. The light-emitting elements are arranged between the light input surface of the second light guide part and the circuit board. The plural electric connection elements are electrically connected with the corresponding light-emitting elements.

In an embodiment, the first light guide part is made of a material comprising polycarbonate and titanium dioxide or a material comprising acrylonitrile-butadiene-styrene resin and titanium dioxide.

In an embodiment, the second light guide part is made of polycarbonate or acrylonitrile-butadiene-styrene resin.

From the above descriptions, the present invention provides a joystick module. A light source and a light guide structure are disposed within a main body of the joystick module. The light beams from the light source are guided to a specified site of the main body by the light guide structure. For example, the specified site of the main body is a site that can be directly touched by the user. Consequently, the light beams can be outputted from the specified site of the main body. In the night or in a dark environment, the user may quickly and accurately judge the position of the joystick module according to the light beams outputted from the joystick module. Consequently, the possibility of causing erroneous operations will be minimized. Moreover, the user may selectively control the joystick module to output the light beams or not to output the light beams according to preference. Moreover, according to the settings, the illuminated site of the joystick module may produce a variety of lighting effects. For example, the lighting effects include the marquees effect, the colorful monochrome light effect or the flashing effect, and so on. Moreover, according to the settings, the lighting effect may be varied with the scene change in the game. As mentioned above, the two light guide parts of the light guide structure have different transmittance values. The light guide part with the high transmittance increases the light transfer amount and reduces the light loss. The light guide part with the low transmittance can moderately reduce the brightness of the illuminated site. Consequently, the light injury to the user's eyes will be avoided.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
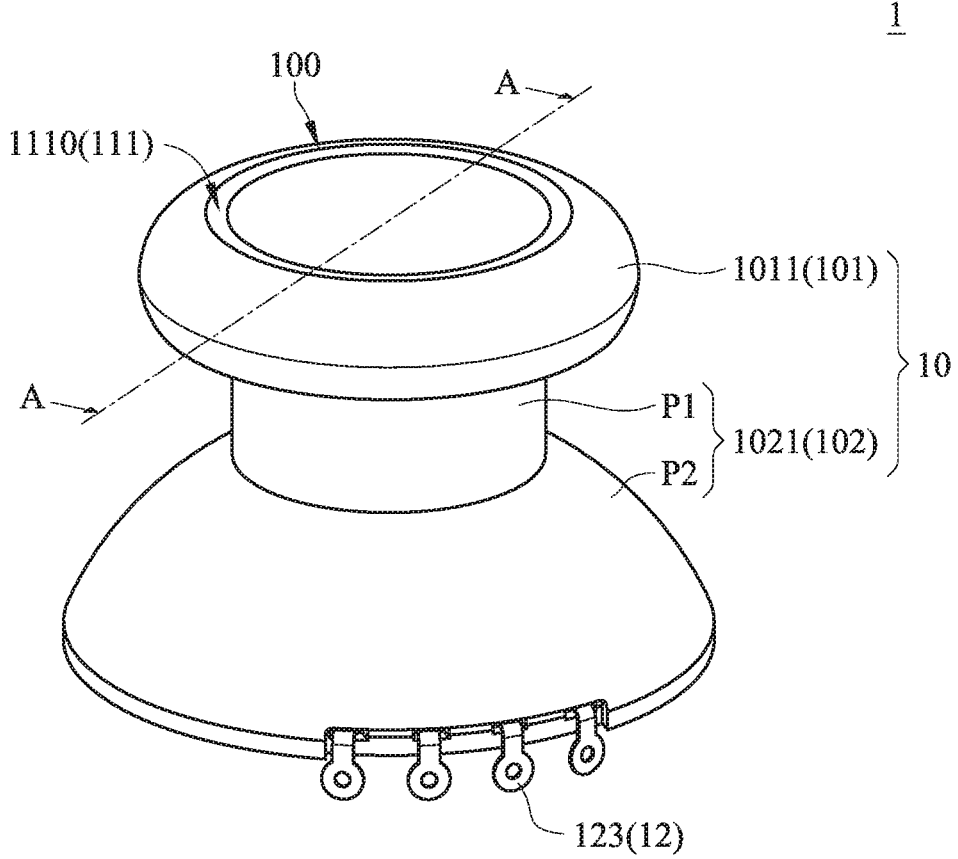
FIG. 1 is a schematic perspective view illustrating the appearance of a joystick module according to an embodiment of the present invention.
Figure 2:
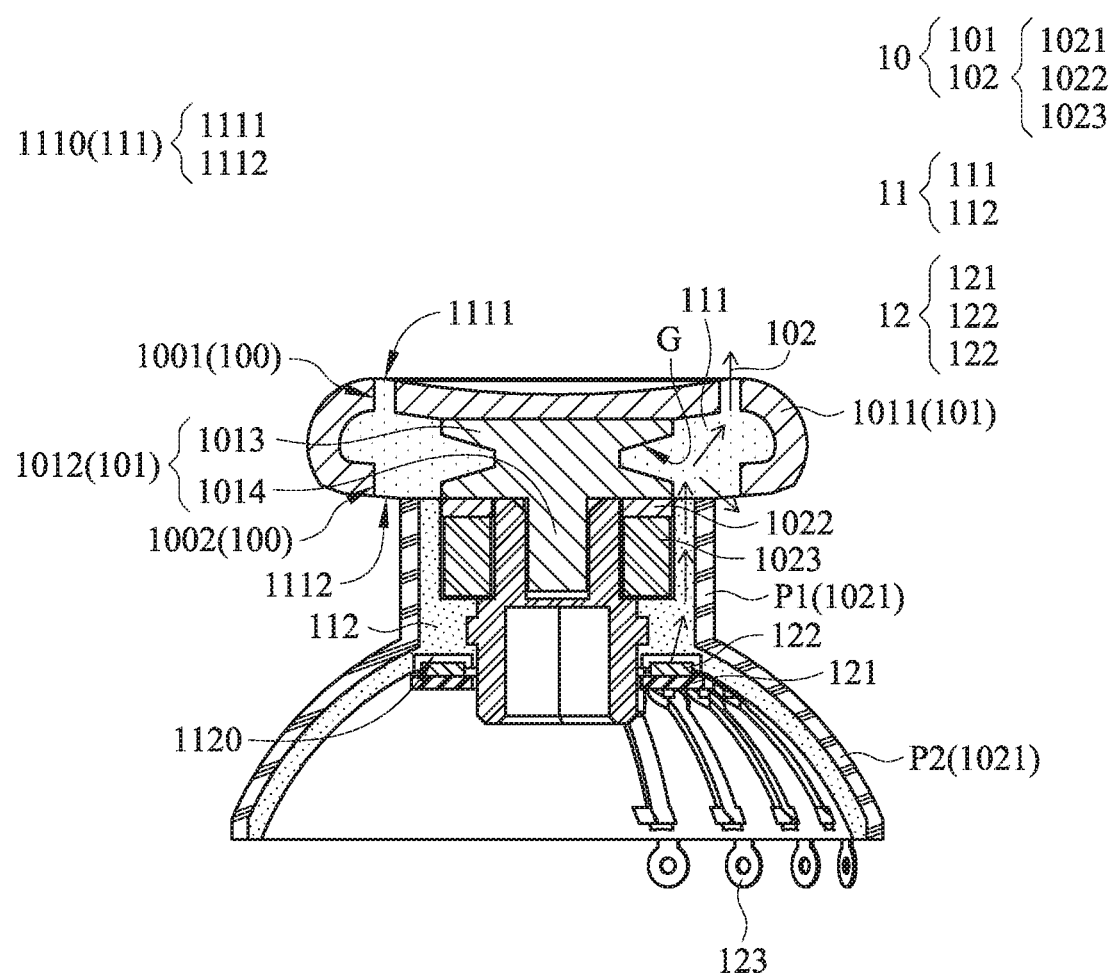
FIG. 2 is a schematic cross-sectional view of the joystick module as shown in FIG. 1 and taken along the line AA.
Figure 3:
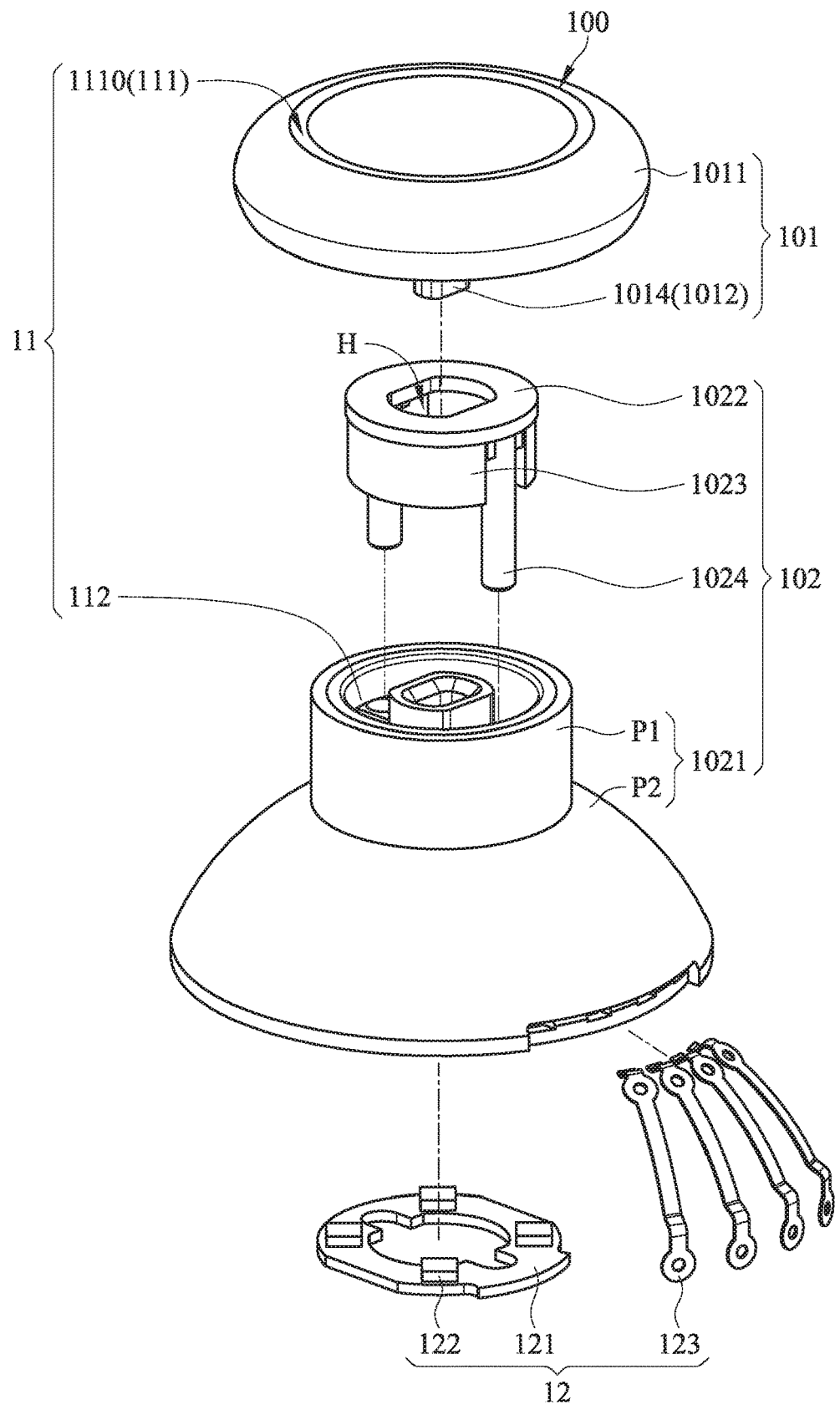
FIG. 3 is a schematic exploded view of the joystick module as shown in FIG. 1.

Please refer to FIGS. 1, 2 and 3. FIG. 1 is a schematic perspective view illustrating the appearance of a joystick module according to an embodiment of the present invention. FIG. 2 is a schematic cross-sectional view of the joystick module as shown in FIG. 1 and taken along the line AA. FIG. 3 is a schematic exploded view of the joystick module as shown in FIG. 1. As shown in FIGS. 1, 2 and 3, the joystick module 1 comprises a main body 10, a light guide structure 11 and a light source 12.

The main body 10 comprises at least one hollow region 100. The light guide structure 11 is disposed within the main body 10. The light guide structure 11 comprises a first light guide part 111 and a second light guide part 112, which have different transmittances. The first light guide part 111 has at least one light output surface 1110, which is exposed outside the hollow region 100. The second light guide part 112 has a light input surface 1120. The light source 12 is disposed within the main body 10. Moreover, the light source 12 is located beside the light input surface 1120 of the second light guide part 112. The light source 12 emits light beams. The light beams are introduced into the light guide structure 11 through the light input surface 1120 of the second light guide part 112 and exited from the light output surface 1110 of the first light guide part 111. Consequently, the light beams can be outputted from a specified site of the main body 10 of the joystick module 1.

The detailed structure of the joystick module 1 will be described as follows.

Please refer to FIGS. 1, 2 and 3 again. The main body 10 comprises a first joystick part 101 and a second joystick part 102. The first joystick part 101 and the second joystick part 102 are connected with each other. The first light guide part 111 of the light guide structure 11 is disposed within the first joystick part 101. The second light guide part 112 of the light guide structure 11 is disposed within the second joystick part 102. The hollow region 100 is formed in the first joystick part 101.

In an embodiment, the first joystick part 101 comprises a cap structure 1011 and a first magnetic element 1012. The hollow region 100 is formed in the cap structure 1011. The first magnetic element 1012 comprises a supporting portion 1013 and an extension portion 1014. A first end of the supporting portion 1013 is used for supporting the cap structure 1011. The extension portion 1014 is connected with a second end of the supporting portion 1013 and extended toward the second joystick part 102. Moreover, the extension portion 1014 is disposed within the second joystick part 102.

The second joystick part 102 comprises a casing 1021, a support element 1022 and a second magnetic element 1023. The support element 1022 and the second magnetic element 1023 are disposed within the casing 1021. A first end of the support element 1022 is used for supporting the first magnetic element 1012. Particularly, the supporting portion 1013 of the first magnetic element 1012 is contacted with the first end of the support element 1022, and the extension portion 1014 of the first magnetic element 1012 is penetrated through a perforation H of the support element 1022. The second magnetic element 1023 is fixed on a second end of the support element 1022. The extension portion 1014 of the first magnetic element 1012 is enclosed by the second magnetic element 1023. Moreover, the support element 1022 comprises plural clamping parts 1024. The plural clamping parts 1024 are protruded downwardly from a bottom surface of the support element 1022. The second magnetic element 1023 is clamped by the plural clamping parts 1024. Consequently, the second magnetic element 1023 can be fixed on the support element 1022.

Preferably but not exclusively, the cap structure 1011 is made of soft plastic material, and the casing 1021 is made of opaque metallic material or opaque plastic material.

According to the user's requirement, the first joystick part 101 and the second joystick part 102 of the main body 10 may be detached from each other. That is, the first joystick part 101 is detachably connected with the second joystick part 102. When the first joystick part 101 and the second joystick part 102 are connected with each other, the extension portion 1014 of the first magnetic element 1012 is penetrated through the perforation of the H of the support element 1022 and enclosed by the second magnetic element 1023, and the supporting portion 1013 of the first magnetic element 1012 is located over the second magnetic element 1023. Consequently, a magnetic force between the supporting portion 1013 of the first magnetic element 1012 and the second magnetic element 1023 and a magnetic force between the extension portion 1014 of the first magnetic element 1012 and the second magnetic element 1023 are generated. Although the supporting portion 1013 of the first magnetic element 1012 and the second magnetic element 1023 are separated from each other by the support element 1022, the magnetic force between the two components is still generated. Consequently, the first joystick part 101 and the second joystick part 102 are fixed on each other. Due to this structural design, the first joystick part 101 can be easily detached from the second joystick part 102 and replaced with another type of joystick part. For example, the first joystick part 101 of this embodiment is a short-cap joystick part. According to the practical requirements, the short-cap joystick part can be replaced with a long-cap joystick part.

As shown in FIGS. 2 and 3, the light source 12 comprises a circuit board 121, plural light-emitting elements 122 and plural electric connection elements 123. The circuit board 121 is arranged between the plural light-emitting elements 122 and the plural electric connection elements 123. The light-emitting elements 122 emit the light beams 120. Moreover, the light-emitting elements 122 are arranged between the light input surface 1120 of the second light guide part 112 and the circuit board 121. That is, the light-emitting elements 122 are installed on a first surface of the circuit board 121. The plural electric connection elements 123 are installed on a second surface of the circuit board 121. The plural electric connection elements 123 are electrically connected with the corresponding light-emitting elements 122. Moreover, the electric connection elements 123 are electrically connected with a system board of a game handlebar device (not shown). Consequently, a control signal can be transmitted from the game handlebar device to the light-emitting elements 122 through the electric connection elements 123. Preferably but not exclusively, each of the electric connection elements 123 is a metal shrapnel.

The detailed structure of the light guide structure 11 of the joystick module 1 will be described as follows.

Please refer to FIGS. 1, 2 and 3 again. The first light guide part 111 is disposed within the cap structure 1011 of the first joystick part 101. The supporting portion 1013 of the first magnetic element 1012 is enclosed by the first light guide part 111. In an embodiment, the cap structure 1011 has a hollow ring-shaped structure. The first light guide part 111 is formed on an inner wall of the cap structure 1011 and arranged around the supporting portion 1013 of the first magnetic element 1012. Moreover, plural grooves G are formed on a sidewall of the supporting portion 1013. A portion of the first light guide part 111 is extended to the grooves G of the supporting portion 1013. Consequently, the first light guide part 111 can be fixed between the cap structure 1011 and the supporting portion 1013 more securely.

The second light guide part 112 is disposed within the casing 1021 of the second joystick part 102. The support element 1022 and the second magnetic element 1023 are enclosed by the second light guide part 112. The second magnetic element 1023 is arranged between the support element 1022 and the light input surface 1120 of the second light guide part 112. In this embodiment, the casing 1021 comprises a hollow cylindrical structure P1 and a covering structure P2. The support element 1022 and the second magnetic element 1023 are disposed within the hollow cylindrical structure P1. The second light guide part 112 is formed on an inner surface of the hollow cylindrical structure P1 and an inner surface of the covering structure P2 and arranged around the support element 1022 and the second magnetic element 1023. Moreover, the light input surface 1120 of the second light guide part 112 is located near the junction between the hollow cylindrical structure P1 and the covering structure P2.

In this embodiment, two hollow regions 100 are formed in the cap structure 1011. The two hollow regions 100 includes a first hollow region 1001 and a second hollow region 1002. The at least one light output surface 1110 of the first light guide part 111 comprises a first light output surface 1111 and a second light output surface 1112. The first hollow region 1001 is formed in the side of the cap structure 1011 away from the second joystick part 102. That is, the first hollow region 1001 is formed in the top side of the cap structure 1011. The second hollow region 1002 is formed in the side of the cap structure 1011 close to the second joystick part 102. That is, the second hollow region 1002 is formed in the bottom side of the cap structure 1011. Due to the profile of the cap structure 1011, the first hollow region 1001 and the second hollow region 1002 are formed as ring-shaped openings. Moreover, the first light output surface 1111 and the second light output surface 1112 are exposed outside the first hollow region 1001 and the second hollow region 1002, respectively. It is noted that the number of the at least one hollow region 100 is not restricted. That is, the number of the at least one hollow region 100 may be increased or decreased according to the practical requirements. Moreover, the position and the size of the at least one hollow region 100 may be varied according to the practical requirements.

When the first joystick part 101 and the second joystick part 102 are connected with each other, the first light guide part 111 and the second light guide part 112 of the light guide structure 11 are in direct contact with each other. Consequently, a continuous light guiding path is defined by the first light guide part 111 and the second light guide part 112 collaboratively. After the light beams 120 from the light source 12 are introduced into the second light guide part 112 through the light input surface 1120, the light beams 120 are sequentially transferred through the second light guide part 112 and the first light guide part 111 along the light guiding path. Then, the light beams 120 are exited from the first light output surface 1111 corresponding to the first hollow region 1001 and the second light output surface 1112 corresponding to the second hollow region 1002.

In an embodiment, the first light guide part 111 of the light guide structure 11 is made of a low-transmittance translucent material comprising polycarbonate and titanium dioxide or a low-transmittance translucent material comprising acrylonitrile-butadiene-styrene resin and titanium dioxide, and the second light guide part 112 of the light guide structure 11 is made of a high-transmittance material (e.g., polycarbonate or acrylonitrile-butadiene-styrene resin).

From the above descriptions, the present invention provides a joystick module. A light source and a light guide structure are disposed within a main body of the joystick module. The light beams from the light source are guided to a specified site of the main body by the light guide structure. For example, the specified site of the main body is a site that can be directly touched by the user. Consequently, the light beams can be outputted from the specified site of the main body. In the night or in a dark environment, the user may quickly and accurately judge the position of the joystick module according to the light beams outputted from the joystick module. Consequently, the possibility of causing erroneous operations will be minimized. Moreover, the user may selectively control the joystick module to output the light beams or not to output the light beams according to preference. Moreover, according to the settings, the illuminated site of the joystick module may produce a variety of lighting effects. For example, the lighting effects include the marquees effect, the colorful monochrome light effect or the flashing effect, and so on. Moreover, according to the settings, the lighting effect may be varied with the scene change in the game. As mentioned above, the two light guide parts of the light guide structure have different transmittance values. The light guide part with the high transmittance increases the light transfer amount and reduces the light loss. The light guide part with the low transmittance can moderately reduce the brightness of the illuminated site. Consequently, the light injury to the user's eyes will be avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A joystick module, comprising:
    a main body comprising at least one hollow region;
    a light guide structure disposed within the main body, and comprising a first light guide part and a second light guide part with different transmittances, the first light guide part has at least one light output surface exposed outside the hollow region, and the second light guide part has a light input surface; and
    a light source disposed within the main body and located beside the light input surface of the second light guide part, wherein after the light source emits a light beam, the light beam is introduced into the light guide structure through the light input surface of the second light guide part and exited from the at least one light output surface of the first light guide part.

2. The joystick module according to claim 1, wherein the main body comprises a first joystick part and a second joystick part, and the first joystick part and the second joystick part are connected with each other, wherein the first light guide part is disposed within the first joystick part, the second light guide part is disposed within the second joystick part, and the at least one hollow region is formed in the first joystick part.

3. The joystick module according to claim 2, wherein the first joystick part comprises a cap structure and a first magnetic element, wherein the at least one hollow region is formed in the cap structure, and the first magnetic element comprises a supporting portion and an extension portion, wherein a first end of the supporting portion supports the cap structure, the extension portion is connected with a second end of the supporting portion and extended toward the second joystick part, and the extension portion is disposed within the second joystick part, wherein the second joystick part comprises a casing, a support element and a second magnetic element, and the support element and the second magnetic element are disposed within the casing, wherein a first end of the support element supports the first magnetic element, the second magnetic element is fixed on a second end of the support element, and the extension portion of the first magnetic element is enclosed by the second magnetic element.

4. The joystick module according to claim 3, wherein the first joystick part is detachably connected with the second joystick part, wherein when the first joystick part and the second joystick part are connected with each other, a magnetic force is generated between the first magnetic element of the first joystick part first joystick part and the second magnetic element of the second joystick part, so that the first joystick part and the second joystick part are fixed on each other.

5. The joystick module according to claim 3, wherein the first light guide part is disposed within the cap structure, the supporting portion of the first magnetic element is enclosed by the first light guide part, and the at least one light output surface of the first light guide part is exposed outside the at least one hollow region of the cap structure, wherein the second light guide part is disposed within the casing, the support element and the second magnetic element are enclosed by the second light guide part, and the second magnetic element is arranged between the support element and the light input surface of the second light guide part.

6. The joystick module according to claim 5, wherein the at least one hollow region comprises plural hollow regions including a first hollow region and a second hollow region, and the at least one light output surface of the first light guide part comprises a first light output surface and a second light output surface, wherein the first hollow region is formed in a first side of the cap structure away from the second joystick part, the second hollow region is formed in a second side of the cap structure close to the second joystick part, the first light output surface is exposed outside the first hollow region, and the second light output surface is exposed outside the second hollow region.

7. The joystick module according to claim 1, wherein the first light guide part and the second light guide part of the light guide structure are in direct contact with each other, so that a continuous light guiding path is defined by the first light guide part and the second light guide part collaboratively.

8. The joystick module according to claim 1, wherein the light source comprises a circuit board, plural light-emitting elements and plural electric connection elements, wherein the circuit board is arranged between the plural light-emitting elements and the plural electric connection elements, the light-emitting elements are arranged between the light input surface of the second light guide part and the circuit board, and the plural electric connection elements are electrically connected with the corresponding light-emitting elements.

9. The joystick module according to claim 1, wherein the first light guide part is made of a material comprising polycarbonate and titanium dioxide or a material comprising acrylonitrile-butadiene-styrene resin and titanium dioxide.

10. The joystick module according to claim 1, wherein the second light guide part is made of polycarbonate or acrylonitrile-butadiene-styrene resin.

\* \* \* \* \*